US011240843B2

(12) United States Patent
Bendlin et al.

(10) Patent No.: US 11,240,843 B2
(45) Date of Patent: Feb. 1, 2022

(54) CORRELATOR-BASED CARRIER SENSE MULTIPLE ACCESS

(71) Applicant: AT&T Intellectual Property I, L.P., Atlanta, GA (US)

(72) Inventors: Ralf Bendlin, Cedar Park, TX (US); Arunabha Ghosh, Austin, TX (US); Aditya Chopra, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 281 days.

(21) Appl. No.: 16/459,937

(22) Filed: Jul. 2, 2019

(65) Prior Publication Data

US 2021/0007142 A1 Jan. 7, 2021

(51) Int. Cl.

| | |
|---|---|
| ***H04W 74/08*** | (2009.01) |
| ***H04L 12/26*** | (2006.01) |
| *H04W 56/00* | (2009.01) |

(52) U.S. Cl.

CPC ......... *H04W 74/0816* (2013.01); *H04L 43/16* (2013.01); *H04W 56/001* (2013.01)

(58) Field of Classification Search

None

See application file for complete search history.

(56) References Cited

U.S. PATENT DOCUMENTS

| | | | | |
|---|---|---|---|---|
| 2014/0341018 | A1* | 11/2014 | Bhushan | H04L 5/001 370/230 |
| 2016/0066195 | A1* | 3/2016 | Moon | H04W 16/14 455/454 |
| 2019/0182800 | A1* | 6/2019 | Park | H04W 80/02 |
| 2020/0196354 | A1* | 6/2020 | Li | H04W 74/0808 |

OTHER PUBLICATIONS

3GPP, "Release 15," Update of Apr. 26, 2019, https://www.3gpp.org/release-15, 3 pages.

Wikipedia, "IEEE 802.11," Retrieved: Oct. 2, 2019, https://en.wikipedia.org/wiki/IEEE_802.11, 24 pages.

(Continued)

*Primary Examiner* — Shirpal K Khajuria

(74) *Attorney, Agent, or Firm* — Amin, Turocy & Watson, LLP

(57) ABSTRACT

The disclosed subject matter is directed towards a clear channel assessment procedure based on a common preamble, such as for use with 3GPP and IEEE 802.11 technologies, or any other radio technology, including for use in the 6 GHz band. Detection of the common preamble is based on detecting known sequences in signal part, which can be detected without decoding the preamble's payload (channel) part to determine an ongoing transmission's duration. If an ongoing transmission is detected, subsequent energy detection monitoring is performed to determine when transmission ends, which can use a different energy detection threshold from what is used in the initial clear channel assessment's energy detection. The technology facilitates the usage of different sampling rates by different radio technologies that work concurrently in the same unlicensed band, by correlating a received preamble with a stored preamble that accounts for deterministic distortions arising from the different sampling rates.

20 Claims, 11 Drawing Sheets

100 110 111 120 121 122 112 130 148 189 188 180 WI-FI Device WI-FI Network 172

(56) References Cited

OTHER PUBLICATIONS

Wikipedia, "IEEE 802.11a-1999," Retrieved: Oct. 2, 2019, https://en.wikipedia.org/wiki/IEEE_802.11a-1999, 3 pages.
Wikipedia, "IEEE 802.11ac," Retrieved: Oct. 2, 2019, https://en.wikipedia.org/wiki/IEEE_802.11ac, 16 pages.
Wikipedia, "IEEE 802.11ax," Retrieved: Oct. 2, 2019, https://en.wikipedia.org/wiki/IEEE_802.11ax, 8 pages.
Wikipedia, "IEEE 802.11n-2009," Retrieved: Oct. 2, 2019, https://en.wikipedia.org/wiki/IEEE_802.11n-2009, 16 pages.
3GPP, "Release 13," ©3GPP 2019, https://www.3gpp.org/release-13, 2 pages.
3GPP, "3rd Generation Partnership Project; Technical Specification Group Radio Access Network; Physical layer procedures for shared spectrum channel access (Release 15)," 3GPP TS 37.213 V15.2.0 (Mar. 2019), 20 pages.

* cited by examiner

CORRELATOR-BASED CARRIER SENSE MULTIPLE ACCESS

TECHNICAL FIELD

The subject application relates to wireless communications systems in general, and more particularly to fifth generation (5G) cellular wireless communications systems and/or other next generation networks, including where base stations and mobile stations (user equipment) operate on frequencies that are shared with other base stations and mobile stations and may use different air interfaces and/or radio technologies.

BACKGROUND

Mobile network operators (MNOs) traditionally obtain licenses in the 700-2,500 MHz range for their cellular communications systems such as the 3rd Generation Partnership Project (3GPP) Universal Mobile Telecommunications System (UMTS) or 3GPP Long-Term Evolution (LTE). A limited amount of spectrum is unlicensed, such as the 2.4 GHz industrial, scientific and medical (ISM) band as well as the 5 GHz Unlicensed National Information Infrastructure (U-NII) band.

License-assisted access (LAA) schemes as standardized in 3GPP LTE and 3GPP New Radio (NR) allow user equipment to operate on traditional licensed and unlicensed spectrum in a coordinated manner. Regulations for unlicensed spectrum exist that require user equipment and base station devices to adhere to a set of rules, including rules that govern the coexistence among users and mobile network operators that may use the unlicensed spectrum in an uncoordinated manner.

In the 5 GHz band, channel access procedures differ between 3GPP and IEEE 802.11 technologies, including different energy detection (ED) based thresholds, and the use of a dual threshold detection mechanism based on energy detection followed by preamble detection (PD). The different ED thresholds and different clear channel access (CCA) procedures in the 5 GHz band results in significant issues related to the fair and efficient shared operation of LTE LAA and 802.11.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
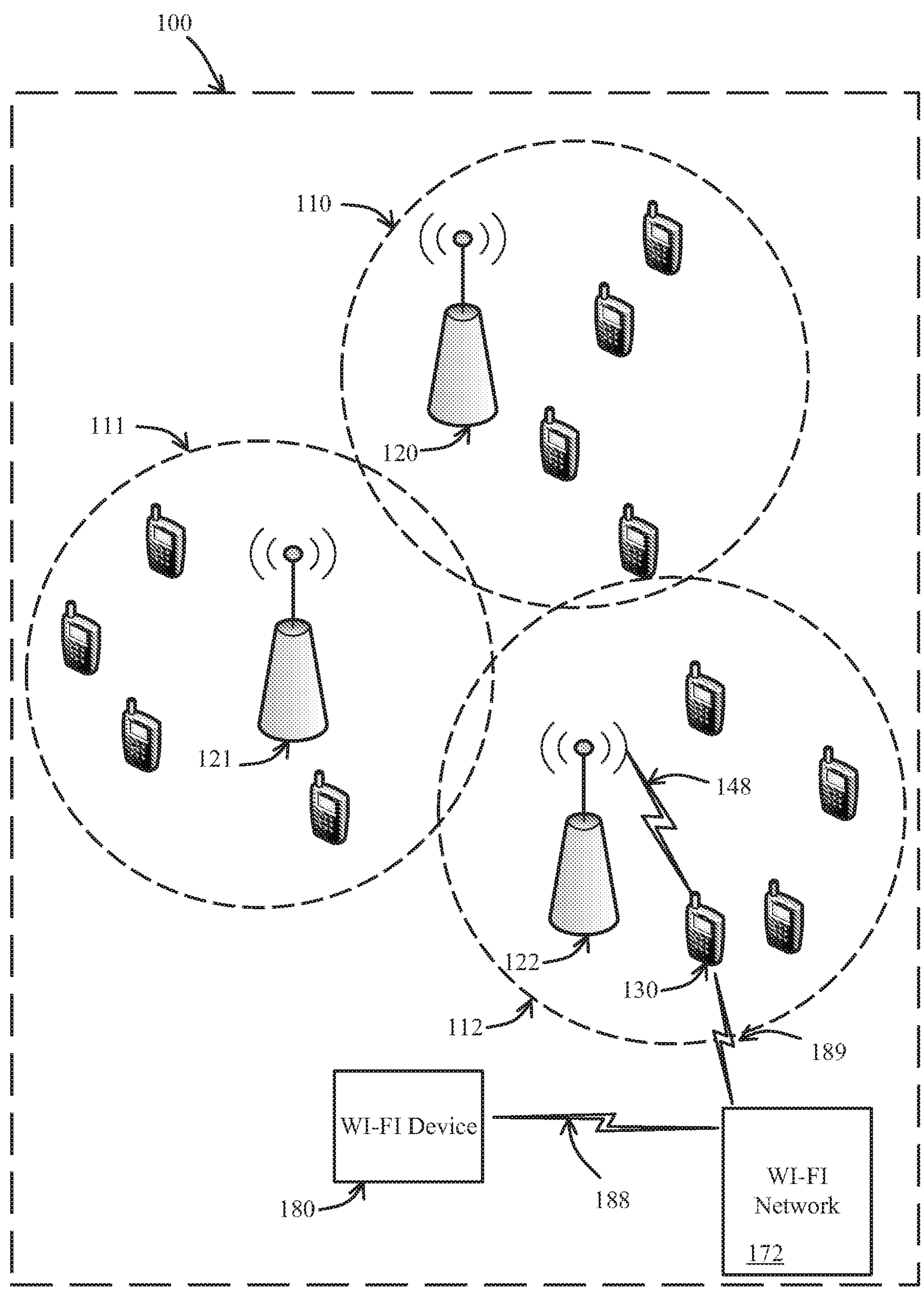
FIG. 1 illustrates an example wireless communication system including base stations, user equipment and a Wi-Fi network, in accordance with various aspects and embodiments of the subject disclosure.

The technology described herein is generally directed towards a common channel access procedure, including where base stations and mobile stations (user equipment) operate on frequencies that are shared with other base stations and mobile stations via carrier sense multiple access and where base stations and mobile stations may use different air interfaces and/or radio technologies. Aspects of the technology are more particularly directed to a common preamble technology for 3GPP and IEEE 802.11 technologies, or any other radio technology, such as technology that operates in the 6 GHz band. As will be understood, the common preamble technology relies on known sequences in the signal part of a transmission, and as a result, no protocols and/or procedures need to be implemented to facilitate the decoding of a payload in the channel part, including a payload that may potentially be protected by forward error correction (FEC) coding.

Note that different radio technologies generally may be developed and maintained under different standards developing organizations (SDOs). Further, while the technology described herein focuses on the 6 GHz band, the technology is not limited to any particular band. For example, the technology described herein is able to provide a solution for the 5 GHz band, that is, if the legacy Wi-Fi preamble is adopted with the dual ED/PD mechanism described herein as an option.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

License-assisted access (LAA) schemes as standardized in 3GPP LTE and 3GPP New Radio (NR) allow user equipment to operate on traditional licensed and unlicensed spectrum in a coordinated manner. For example, FIG. 1 shows, in an exemplary wireless communications network 100, a first mobile network operator that deploys base stations 120 and 121 providing cellular wireless data, voice and multimedia services to user equipment in geographic areas 110 and 111, respectively. A second operator provides coverage to other user equipment in cell 112 by means of base station 122. An exemplary user equipment (UE) is shown in 130. Each mobile network serves a plurality of UEs (subscribers).

Each MNO may serve UEs in respective coverage areas ("cells") 110, 111, 112 via two or more frequency bands. On each frequency band, a bidirectional communications link 148 is established between one or more base station and one or more UE devices.

Further shown in FIG. 1 is a WI-FI network 172, such as operating in an unlicensed band. As is shown, a Wi-Fi device 180 communicates with the WI-FI network 172 via a bidirectional communications link 188. As in understood, license-assisted access allows the user equipment 130 to similarly have a bidirectional communications link 189 with the WI-FI network 172. In general, the user equipment 130 and the Wi-Fi device 180 typically operate to avoid collisions, such as by physical carrier sensing commonly referred to as Listen-before-Talk (LBT).

Figure 2:
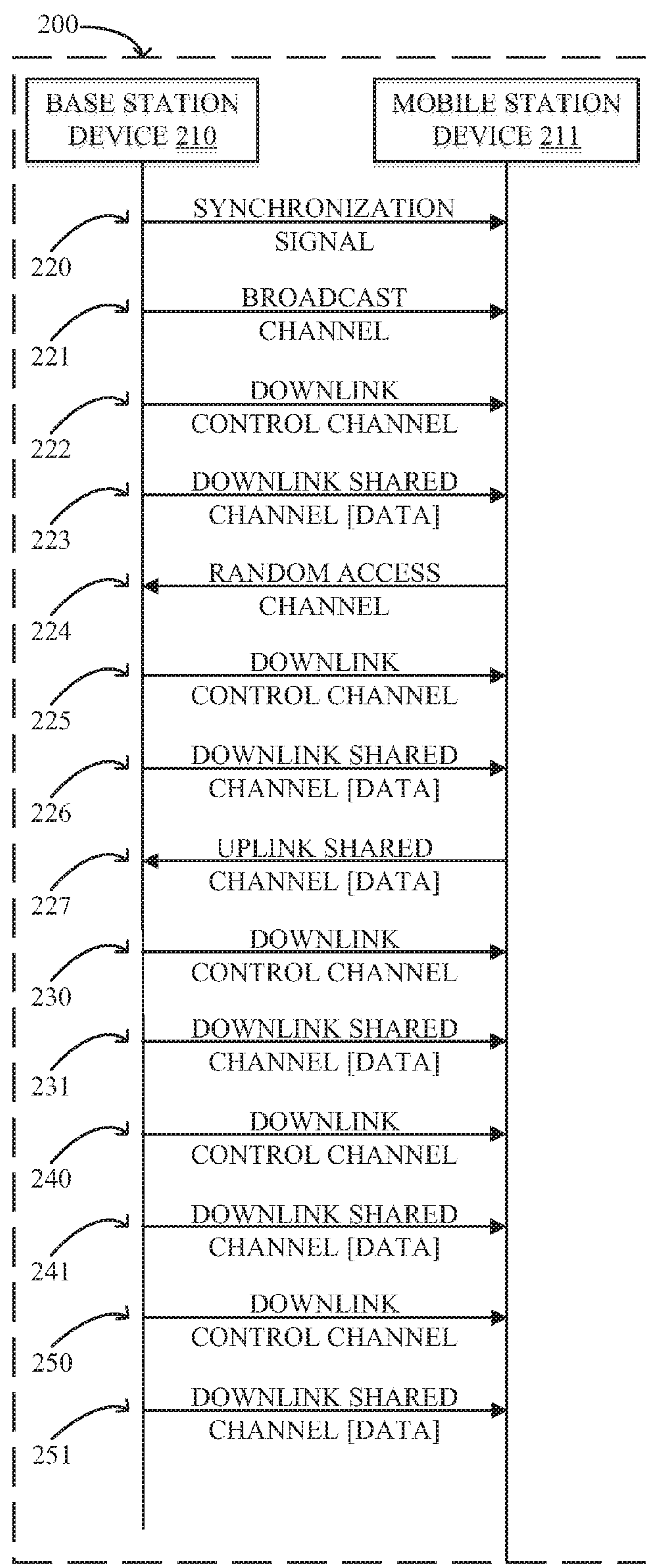
FIG. 2 illustrates an example timing diagram showing communications between a base station and a mobile station device, in accordance with various aspects and embodiments of the subject disclosure.

As shown in FIG. 2, a UE or mobile station device 211 performs a cell search procedure in an exemplary system 200 by decoding a synchronization signal 220 from a base station device 210. For instance, the base station device 210 may be one of the base stations 120, 121, 122 of the wireless communications network 100 in FIG. 1 and the mobile station device 211 may be the user equipment 130 in the wireless communications network 100. The synchronization signal 220 is then transmitted via the air interface 140 between a base station device and a mobile station device (UE).

After successfully decoding the synchronization signal 220, the mobile station device 211 proceeds to acquiring the master system information carried on the physical broadcast channel (PBCH) 221. The master system information configures the UE for reception of remaining system information (RMSI) transmitted by a physical downlink shared channel (PDSCH) 223 which is scheduled by a physical downlink control channel transmission (PDCCH) 221. The RMSI then configures the UE for a random access procedure whereby mobile station device 211 sends a physical random access channel (PRACH) 224 to base station device 210 (message 1).

The base station device 210 responds via a random access response (RAR) carried by a physical downlink shared channel (PDSCH) 226 scheduled by a physical downlink control channel transmission (PDCCH) 225 (message 2). Finally, the mobile station device 211 sends message 3 on a physical uplink shared channel (PUSCH) 227 scheduled by message 2 in 226. If needed, contention resolution is performed by the network by transmitting message 4 from base station device 210 to the intended mobile station device 211 informing other contending UEs of the contention. Message 4 is scheduled by PDCCH 230 and transmitted by PDSCH 231. After successful contention resolution, mobile station device 211 is provided a dedicated radio resource control (RRC) configuration in PDSCH transmission 240 which is scheduled by PDCCH 241. At this point, the base station device 210 and mobile station device 211 have successfully established a dedicated communication link 140. Subsequently, the mobile station device 211 may be configured according to the embodiments herein; the configuration is transmitted by PDSCH 251 scheduled by PDCCH 250.

In a license-assisted access (LAA) system, the exemplary system 100 operates on a first carrier frequency in a licensed spectrum. The PDSCH 251 then configures the UE for operation on additional carriers in the unlicensed spectrum. In the first frequency band, radio resource control (RRC) and radio resource management (RRM) is under full control of the base station devices of a given mobile network operator that holds the license for the first frequency band, for example, base stations 120 and 121 in FIG. 1. However, the same is not true for operation on the second frequency band, which is shared among multiple mobile network operators due to its unlicensed nature. While base stations 120 and 121 still control UEs connected to them in geographic areas 110 and 111, there may be other base stations with other UEs that operate independently.

Alternatively, and unlike LAA operation, in a standalone (SA) deployment, the exemplary system 100 operates only on the second frequency band in unlicensed spectrum. Thus, a significant difference between a standalone system as opposed to a LAA system is that the messaging in FIG. 2 occurs on an exclusively licensed carrier in LAA, whereas for standalone the messaging takes place on the unlicensed carrier itself. In other words, LAA systems need at least two carriers, one in the licensed spectrum and one in the unlicensed spectrum, whereas standalone systems can be entirely deployed using only unlicensed frequency bands. In either LAA or SA deployments, additional carriers may be configured using the carrier aggregation (CA) framework specified by 3GPP for both 4G LTE and 5G NR.

Thus, unlicensed spectrum may be shared by a plurality of mobile network operators. In addition to base and mobile stations from mobile network operators, in either non-standalone (NSA) LAA or standalone (SA) deployments, additional base and mobile stations may also operate in overlapping spectrum in unlicensed frequency bands. Examples of such additional base stations, represented by the WI-FI network 172 in FIG. 1, are commonly referred to as access points (APs), and may comprise managed enterprise networks or residential access points such as Wi-Fi routers, such as connected to cable set-top boxes or the like with Digital Subscriber Line (DSL), optical fiber backhaul connections, or the like.

Several wireless communications standards exist, such as IEEE 802.11, LTE-LAA or NR based access to unlicensed spectrum (NR-U), that allow coexistence among uncoordinated networks in unlicensed frequency bands. The technology described herein provides various enhancements to such existing wireless communications standards. More particularly, the embodiments described herein address problems that exist with respect to ensuring that fair coexistence can be guaranteed when a plurality of different radio technologies with different air interfaces share the same spectrum resources.

Figure 3:
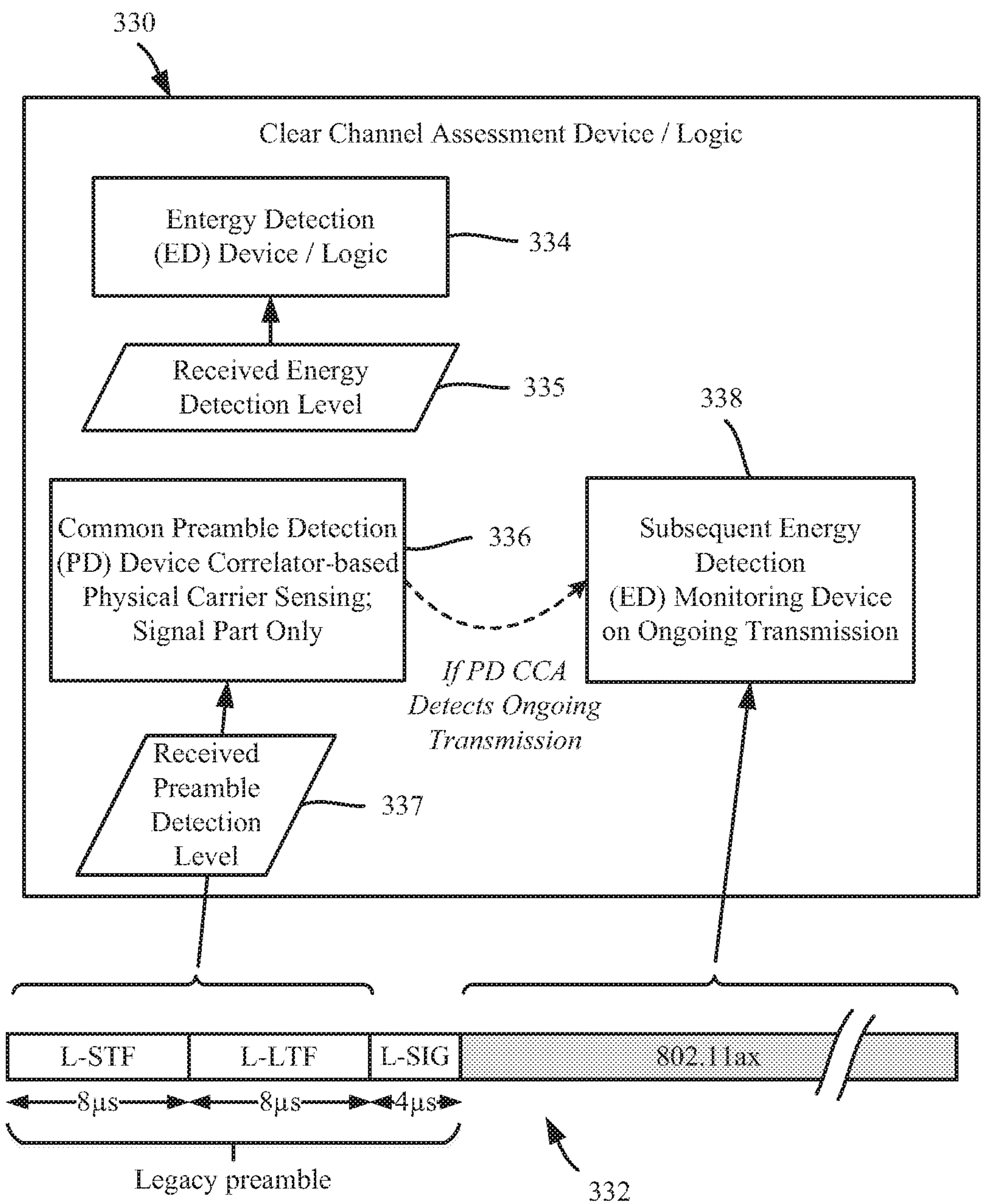
FIG. 3 is an example block diagram representing clear channel assessment device/logic that operates with common preamble detection, in accordance with various aspects and embodiments of the subject disclosure.

FIG. 3 depicts an example of how Clear Channel Assessment Device/Logic 330 operates with respect to a transmission 332 according to the IEEE 802.11ax standard. A transmission burst begins with the legacy IEEE 802.11a preamble comprising the legacy short training field (L-STF), legacy long training field (L-LTF) and legacy signal (L-SIG) field. In this example transmission 322, the legacy preamble is followed by the IEEE 802.11ax preamble, which in turn is followed by the IEEE 802.11ax data. Note that for other members of the IEEE 802.11 family of Wi-Fi standards such as IEEE 802.11n or IEEE 802.11ac, the same procedure of concatenating the legacy preamble with a new preamble followed by data applies. To guarantee backward compatibility with the original IEEE 802.11a standard, the above legacy preamble as illustrated in FIG. 3 is part of the preambles that were introduced later as part of the evolution of the 802.11 standard.

Existing solutions are based on Carrier Sense Multiple Access (CSMA) schemes I which either physical and/or virtual carrier sensing is performed to avoid collisions between uncoordinated nodes. For example, a base station or mobile station may perform energy detection (ED) to check for on-going transmissions before commencing a transmission on its own. Energy detection is an example of physical carrier sensing and is commonly referred to as Listen-before-Talk (LBT).

Both 3GPP LTE-LAA and NR-U as well as IEEE 802.11 use ED as part of their channel access procedures. For example, the 3GPP physical layer procedures for shared spectrum channel access in 3GPP technical specification (TS) No. 37.213 (Version 15.2.0 from 2019-March) state: "A slot duration $T_{sl}$ is considered to be idle if the eNB senses the channel during the slot duration, and the power detected by the eNB for at least 4 μS within the slot duration is less than energy detection threshold $X_{Thresh}$." Furthermore, "the eNB may transmit a transmission including PDSCH/PDCCH/EPDCCH on a carrier on which LAA cell(s) transmission(s) are performed, after first sensing the channel to be idle."

Virtual carrier sensing, on the other hand, requires decoding of the legacy signal (L-SIG) field which carries information about the length of the ongoing transmission. The L-SIG has 24 bits that are transmitted over the air interface using binary phase shift keying (BPSK) modulation. The virtual carrier sensing mechanism used by IEEE 802.11 relies on the devices decoding the L-SIG field in order to obtain the network allocation vector (NAV). Because the preamble, specifically the L-SIG field, informs the duration of the transmission, virtual carrier sensing, unlike physical energy detection, is a logical mechanism used to determine whether the medium is busy or idle. From a power savings perspective, the L-SIG conveys to a device the duration for which it can defer from accessing the medium. From a channel access perspective, the L-SIG lets a device set its NAV to determine for how long the sending station will occupy the channel. If the NAV is non-zero, the medium is considered busy. When then NAV expires, the medium is considered idle.

Thus, for conventional virtual carrier sensing as part of clear channel assessment (CCA), the legacy preamble indicates the duration of the transmission in the L-SIG field. A second station detects and decodes the preamble (i.e., PD CCA fails) and thus defers until the end of the ongoing transmission. If instead CCA passes then the second station can commence its own transmission, hence the term Carrier Sense Multiple Access (CSMA). In theory, the same mechanism can be used if different radio technologies share the medium.

While conventional virtual carrier sensing could work in principle, they exhibit several drawbacks. For one, different standards for various radio technologies, although designed for identical spectrum, may operate at different sampling rates. If the sampling rates are non-integer multiples of each other, fractional sampling rate conversion needs to be performed, which requires additional circuitry and/or software at the expense of additional processing delay. For example, a first radio standard, e.g., IEEE 802.11ax, may use a first sampling rate, whereas a second radio standard, such as 3GPP NR-U inherits its sampling rate from 3GPP NR Rel. 15 which was designed earlier and exclusively for licensed spectrum without any special consideration of coexistence with other radio technologies. Hence, IEEE 802.11ax and 3GPP NR-U are defined with non-identical sampling rates. A preamble for both standards thus would have to be defined at a single pre-determined sampling rate, whereby at least some devices would have to convert the sampling rates to receive the preamble at a first sampling rate and the data payload at a second sampling rate, which is undesirable.

Another drawback is that because the L-SIG field (or any other preamble common to different standards) needs to convey the duration of the transmission for virtual carrier sensing, channel coding and a protocol stack is required that is common among such radio technologies using such a common preamble. Generally though, channel coding and the protocol stack are very intrinsic to each radio technology and consequently, similar to the above issue, devices of at least some radio technologies would need to implement two channel coding schemes, protocol stacks and the like. For example, a first radio standard, e.g., IEEE 802.11ax, may use a first protocol stack, channel coding scheme, and the like. A second radio standard, such as 3GPP NR-U inherits its protocol stack, channel coding scheme, and the like from 3GPP NR Rel. 15 which was designed earlier and exclusively for licensed spectrum without any special consideration of coexistence with other radio technologies. Hence, IEEE 802.11ax and 3GPP NR-U are defined with non-identical protocol stacks, channel coding schemes, and the like. Implementing two protocol stacks, channel coding schemes, and the like is not desirable.

To overcome such issues, FIG. 3 illustrates performing Clear Channel Assessment (as represented by the clear channel assessment device/logic 330) that operates via physical sensing on the signal part of a common preamble, in contrast to also using virtual sensing on the channel part. To make this possible, both radio technologies share a common preamble comprising the L-STF, L-LTF, and L-SIG, where the description herein uses IEEE 802.11 terminology and procedures as examples for ease of exposition of the underlying principles. By no means are the examples including any terminology to be construed in a limiting sense. Instead, any common preamble design that is shared among two or more radio technologies in overlapping spectrum, that is accessed in an uncoordinated fashion by a plurality of stations, can be employed, including other aspects, features, and advantages of several embodiments of the present disclosure as is understood. Moreover, aspects, features, or advantages of the subject matter can be exploited even if two or more radio technologies that access a medium in an uncoordinated fashion have separate preambles in which only parts of the entire preamble of each radio technology are common. For example, the preambles of different radio standards operating in the same unlicensed bands may each comprise an identical part at the beginning, whereas after said identical part, information specific to each air interface is included in the preamble. For the embodiments, aspects, concepts, structures, functionalities or examples described herein, such a partially common preamble is simply referred to as a common preamble for convenience, in a non-limiting way. Similarly, the term preamble is non-limiting and may refer to the preamble as “channel”, “reference signal”, “signal”, “waveform” and the like.

Figure 4:
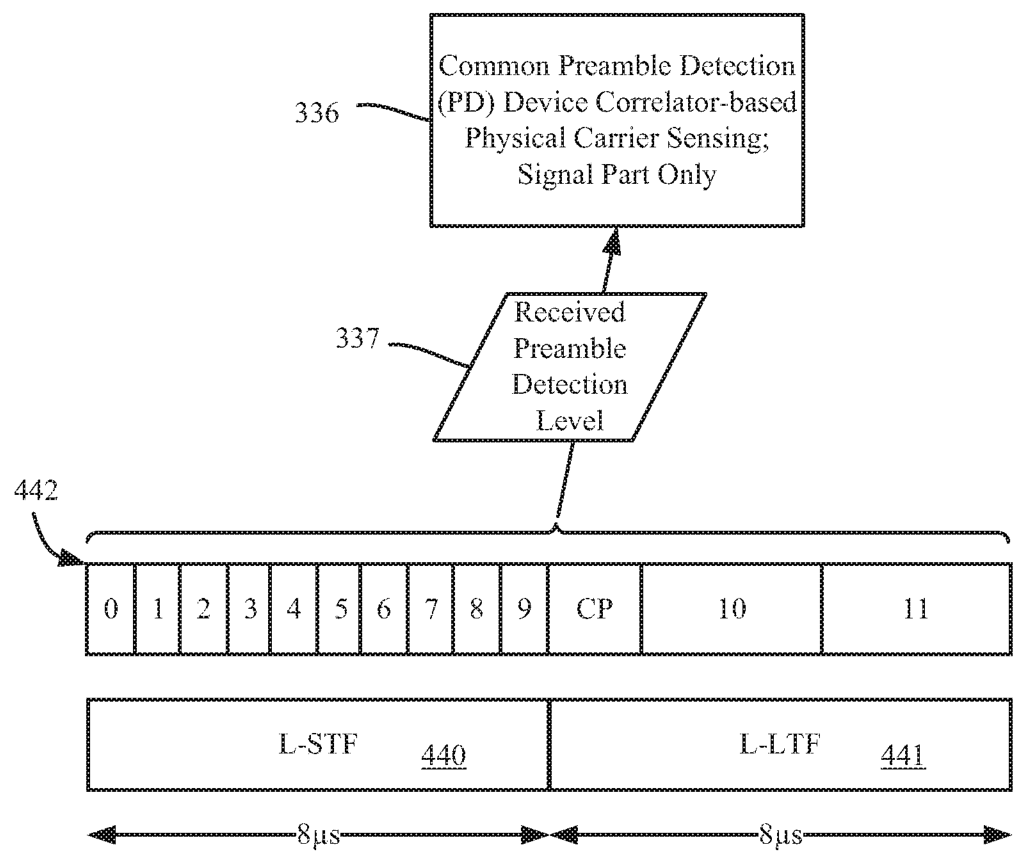
FIG. 4 is an example block diagram representing common preamble detection on a signal part of a transmission, in accordance with various aspects and embodiments of the subject disclosure

FIG. 4 shows the L-STF 440 and L-LTF 441 of the IEEE 802.11 legacy preamble 442. The L-STF 440 comprises ten repetitions (0-9) of a short symbol. A short symbol comprises 16 samples at a sampling period of equal to 50 ns. 16*10*50 ns=8 μs. The L-LTF 441 comprises two repetitions of a long symbol and a cyclic prefix (CP). A long symbol comprises 64 samples whereas the CP comprises 32 samples. (64*2+32)*50 ns=8 μs.

The L-STF and L-LTF fields 440 and 441, respectively, are used for time synchronization, automatic gain control (AGC), frequency offset correction, and channel estimation amongst others. These are signals that do not carry information. The L-SIG field (FIG. 3), on the other hand, carries a payload, e.g., the duration of the transmission, and is thus considered a channel. Consequently, a device needs to detect the L-STF and L-LTF fields, but decode the L-SIG field (e.g., using a binary convolutional code in the example of IEEE 802.11 as well as coherent demodulation of the BPSK symbols by means of channel estimation made possible by the two L-LTF symbols).

The drawbacks above (different sampling rates, protocol stacks, channel coding schemes, and the like) are mainly undesirable in regard to channels which need to be decoded using forward error correction and possibly a cyclic redundancy check (CRC). For the detection of signals, such drawbacks pertaining to different protocol stacks, channel coding schemes, and the like, do not apply because signals do not carry information or payloads. Further, as described herein, solutions can handle with different sampling rates when only detection of signals is being considered.

Described herein, in one embodiment, is having the common preamble comprise only a signal part, with the channel part of any preamble not used across radio technologies. A channel part may still be present, but is not common among radio technologies and only applies to specific radio technologies. For example, 3GPP NR-U and IEEE 802.11ax may share a common preamble comprising only signals, whereas the channel part is exclusive to IEEE 802.11 devices. Similarly, 3GPP NR-U devices may use their own channel part such as a group common (GC) physical downlink control channel (PDCCH).

As shown in FIG. 3, the overall clear channel assessment procedure still comprises a dual threshold detection mechanism of energy detection (ED) 334 that evaluates a received energy detection level 335 followed by common preamble detection (PD) 336 that evaluates a received preamble detection level 337. However, instead of ED followed by PD with virtual carrier sense, the preamble detection only involves a signal part whereby the clear channel assessment procedure comprising ED followed by PD uses physical carrier sensing.

More specifically, the PD device/logic 336 in the embodiments described herein is correlator based, and does not incorporate channel decoding or demodulation. For example, devices that use the clear channel assessment device/logic 330 of FIG. 3 may use auto-correlation schemes/procedures with a lesser computational load, and/or cross-correlation schemes with a higher computational load to detect the common preamble. Cross-correlation schemes are generally more prone to multipath fading channels, because the received waveform is correlated with a stored preamble free of distortions. On the other hand, cross-correlation performs better in noise-limited scenarios with low signal-to-noise (SNR) ratios.

Unlike virtual carrier sense, because the preamble detection stage is correlator based and uses the received waveform (signal) rather than decode a payload carried by the received waveform (that is, the preamble as described herein uses the "signal" part versus the "channel" part), the duration of the ongoing transmission is unknown to other devices even after detecting the ongoing transmission. The ongoing transmission thus is monitored (block 338), such as using subsequent energy detection, in one or more embodiments as described herein More particularly, because preamble detection, even if only correlator based, is computationally more demanding and more power consuming than energy detection, in another embodiment described herein, after preamble detection successfully detects an ongoing transmission, the clear channel assessment device/logic 330 continues to perform energy detection. Once the clear channel assessment device/logic 330 detects that the channel is clear, that is, the ongoing transmission 332 has ended, as shown in FIG. 5 the clear channel assessment device/logic 330 can trigger communication device logic 550 to send a transmission 552.

Figure 5:
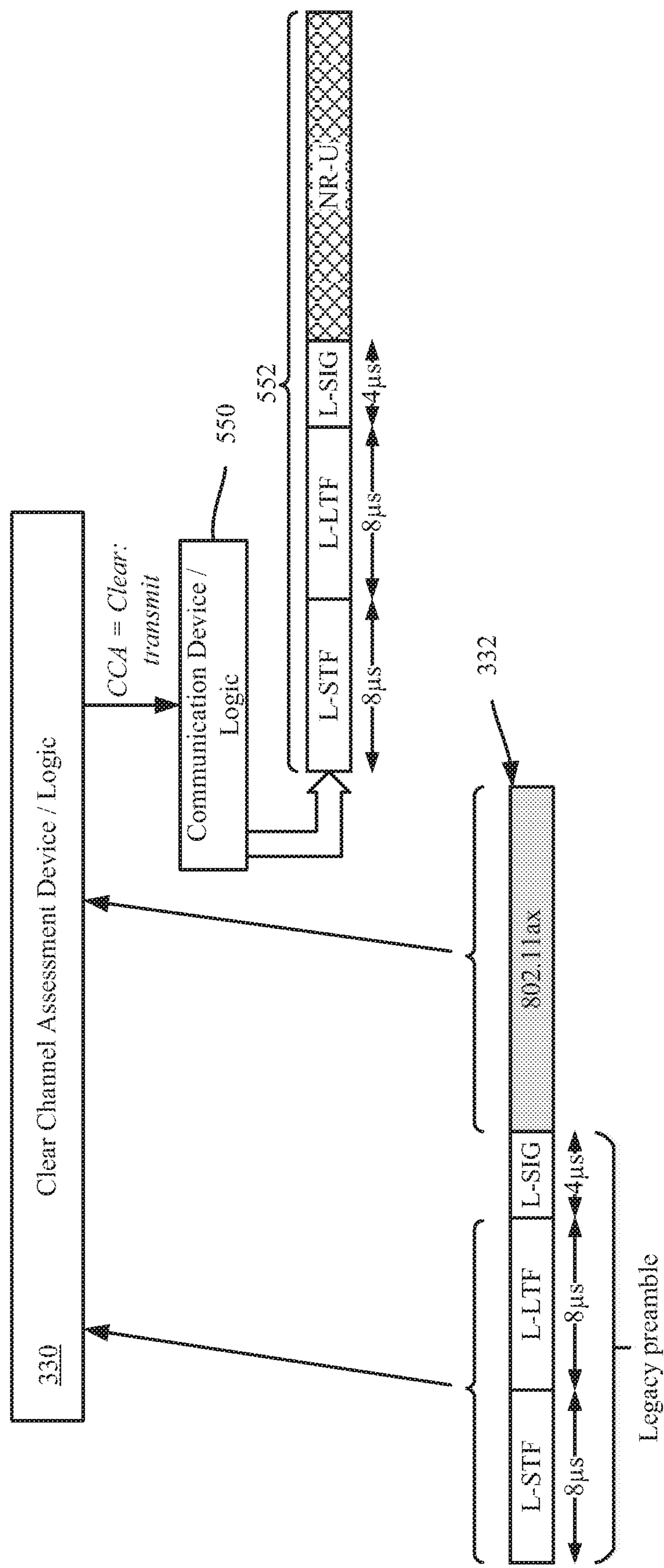
FIG. 5 is an example representation of monitoring via energy detection to determine when a channel is clear for transmission of information, in accordance with various aspects and embodiments of the subject disclosure

In the example of FIG. 5, the transmission 552 is shown as including a new radio transmission NR-U part, to illustrate how a user equipment device can use the physical signal part sensing to determine when an ongoing 802.11 transmission has ended. In other words, FIG. 5 demonstrates detecting an ongoing transmission that is using the IEEE 802.11ax air interface, protocol stack and virtual carrier sensing, yet can be performed by a 3GPP NR-U device using physical sensing on the signal part. It is understood, however, that the technology described herein operates with any common preamble detection that is signal based, whereby, for example, an 802.11 device can use its own instance of the clear channel assessment device/logic 330 to determine when a new radio (NR) transmission has ended.

In one or more implementations, instead of using the ED threshold hat was used in the clear channel assessment procedure that detected the transmission, the monitoring (block 338 of FIG. 3) of an ongoing transmission can use a different ED threshold value, which is a function of the energy/power received when the ongoing transmission was successfully detected. A general purpose of this energy detection procedure with the ED threshold value that is different from the one used for clear channel assessment is to detect the duration of the ongoing transmission, without the need to process any payload in the preamble that explicitly informs the transmission duration.

Figure 6:
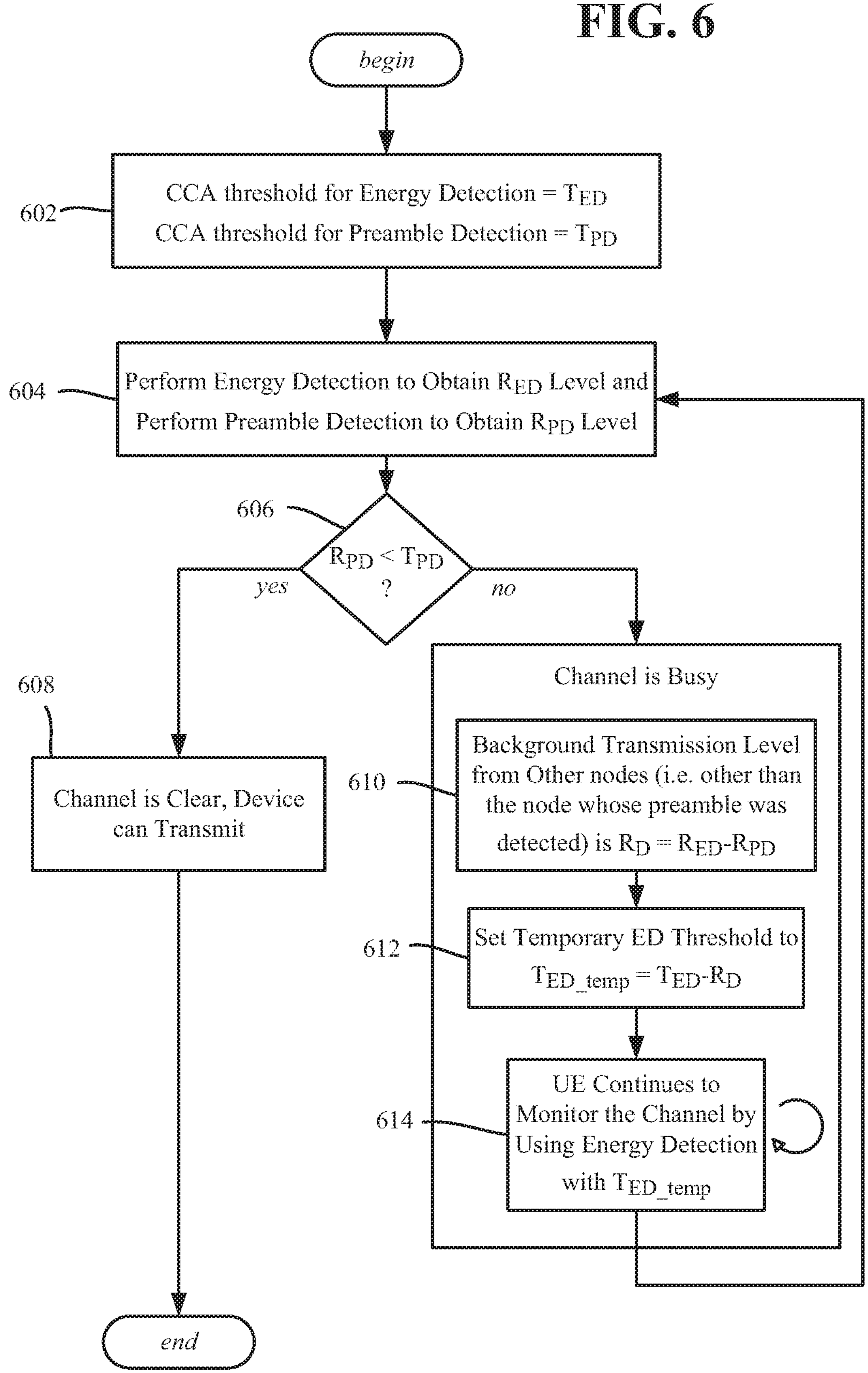
FIG. 6 is a flow diagram representing example operations of clear channel assessment device logic, in accordance with various aspects and embodiments of the subject disclosure.

By way of example, FIG. 6 shows example operations that can be performed by clear channel assessment (CCA) device/logic 330, in which the CCA threshold for ED and PD detection is $T_{ED}$ and $T_{PD}$, respectively (block 602). Note that in general 3GPP uses a single energy detection (ED) based threshold of −72 dBm, whereas Wi-Fi uses a dual threshold detection mechanism based on energy detection at −62 dBm followed by preamble detection (PD) at −82 dBm.

As represented by operation 604, the device/logic 330 performs ED and PD, and the levels it receives are $R_{ED}$ and $R_{PD}$, respectively (the numbers are in linear scale). Operation 606 evaluates the received preamble detection level $R_{PD}$ against the received preamble detection threshold value $T_{PD}$. If $R_{PD}<T_{PD}$ then the channel is clear and the device can transmit, as represented by operation 608.

Otherwise, the received preamble detection level $R_{PD}$ attains the threshold value $T_{PD}$, $R_{PD}\geq T_{PD}$ and the channel is detected as busy. The device (e.g., a UE, such as via block 338 of FIG. 3), then monitors the ongoing transmission, as the device does not know the defer period. To this end, as represented by operation 610, the device knows that the background transmission level from other nodes (i.e. other than the node whose preamble it detected) is $R_D=R_{ED}-R_{PD}$. As represented by operation 610, the device sets a temporary ED threshold to $T_{ED\_temp}=R_{ED}$. The device continues to monitor the channel by using energy detection with $T_{ED\_temp}$. At some point, the ongoing transmission is detected as over, and the device can transmit. Note that as represented in FIG. 6, once the ongoing transmission is no longer detected via the monitoring with the temporary ED threshold, the process can return to operation 604 to perform the dual clear channel assessment procedure as described herein before transmitting information.

Turning to another aspect, a device can use a sampling rate that is different from the one used to transmit the common preamble. For example, a first radio standard, e.g., IEEE 802.11ax, may use a first sampling rate. A second radio standard, such as 3GPP NR-U, inherits its sampling rate from 3GPP NR Rel. 15 which was designed earlier and exclusively for licensed spectrum without any special consideration of coexistence with other radio technologies. Hence, IEEE 802.11ax and 3GPP NR-U are defined with non-identical sampling rates.

A common preamble according to aspects of the embodiments described herein is transmitted using the first sampling rate. A 3GPP device, however, needs to receive data at the second sampling rate. Hence, one solution is to change the sampling rate after receiving the common preamble at a first sampling rate to receive data payload at a second sampling rate. Specifically, if the two sampling rates are non-integer multiples of each other, fractional sampling rate conversion needs to be performed, which requires additional circuitry and/or software at the expense of additional processing delay, and is thus undesirable.

Instead, according to aspects of the technology described herein, in an embodiment, the device operates at a single sampling rate, which is the sampling rate defined by its radio technology, e.g., the second sampling rate used to receive data. Because the common preamble is transmitted using the first sampling rate, whereas the device receives it using the second sampling rate, (to avoid changing the sampling rate between the common preamble and the subsequent data transmission), the received signal when the device tries to detect the common preamble is distorted. However, because the device knows the first and second sampling rate, and because the common preamble is a deterministic signal (rather than a channel with a random payload, i.e., the duration of the transmission), the parameters in such a setup are deterministic. Note that this is beneficial a consequence of not including data/payload into a common preamble, which is exploited by the technology described herein.

Because the parameters are deterministic absent a channel with a payload, the aforementioned distortions are likewise deterministic. Thus, when a device tries to detect the preamble using a single sampling rate different from the one used to transmit the common preamble, the device can account for the aforementioned distortions. Note that this is in contrast to prior cross-correlation-based solutions that assume that the received waveform is correlated with a stored preamble free of distortions. Instead, for aspects related to embodiments described herein, the received waveform can be correlated with a stored preamble that accounts for the deterministic distortions that arise from using the second sampling rate when the common preamble is transmitted using the first sampling rate.

Figure 7:
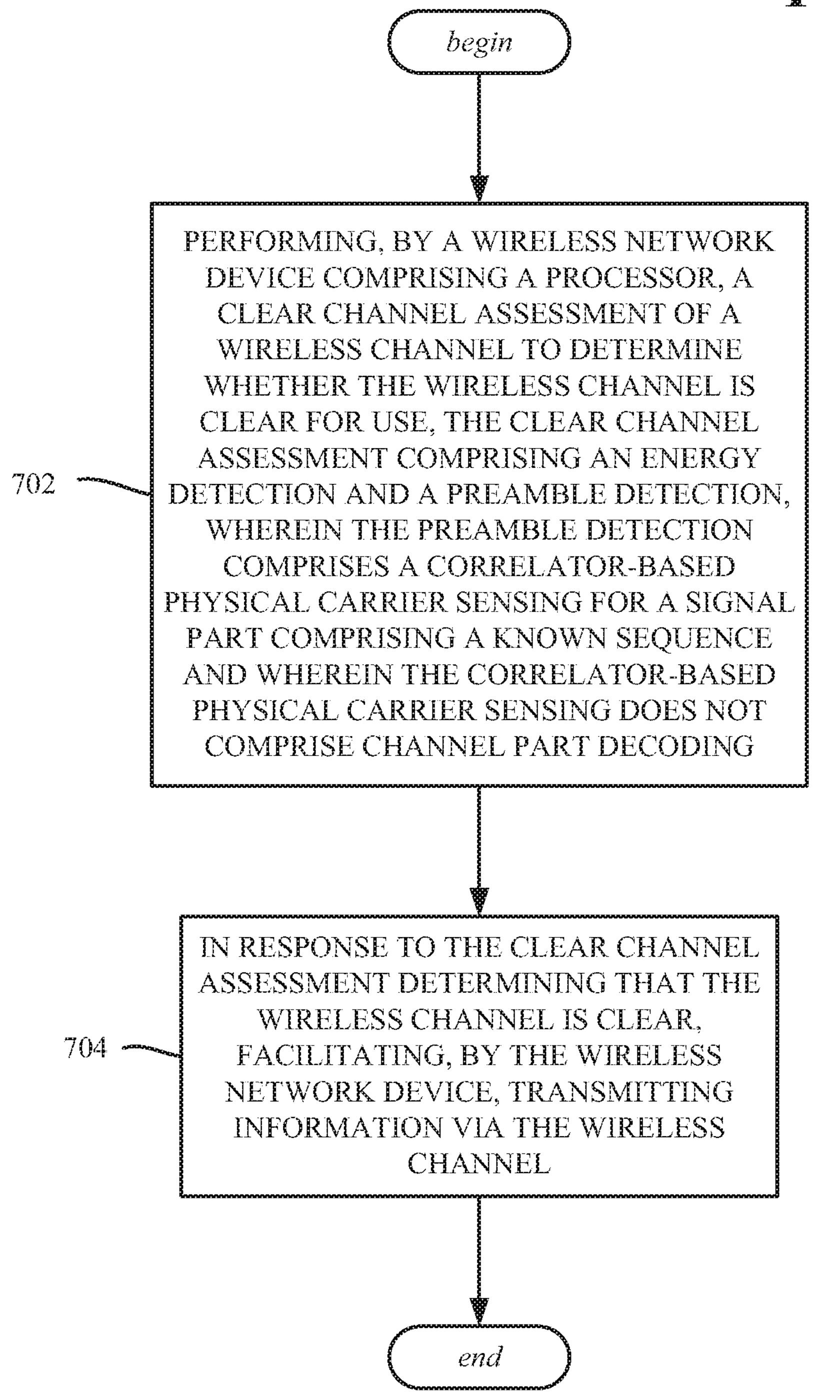
FIG. 7 illustrates example operations of a wireless network device to clear channel assessment before transmission of information, in accordance with various aspects and embodiments of the subject disclosure.

One or more aspects, such as those implemented in example operations (e.g., performed by a wireless network device comprising a processor) of a method, are represented in FIG. 7, and are directed towards performing (operation 702) a clear channel assessment of a wireless channel to determine whether the wireless channel is clear for use, the clear channel assessment comprising an energy detection and a preamble detection, wherein the preamble detection comprises a correlator-based physical carrier sensing for a signal part comprising a known sequence and wherein the correlator-based physical carrier sensing does not comprise channel part decoding. Operation 704 represents, in response to the clear channel assessment determining that the wireless channel is clear, facilitating, by the wireless network device, transmitting information via the wireless channel.

Aspects can comprise, in response to the clear channel assessment determining that the wireless channel is not clear for use, performing, by the wireless network device, a subsequent energy detection to monitor the wireless channel that is subsequent to the energy detection.

The energy detection can be a first energy detection using a first energy detection threshold value; aspects can comprise, in response to the clear channel assessment determining that the wireless channel is not clear for use, performing, by the wireless network device, a second energy detection to monitor the wireless channel comprising using a second energy detection threshold value that is different from the first energy detection threshold value. Aspects can comprise determining, by the wireless network device, the second energy detection threshold value based on a received energy detection level and a received preamble detection level.

The correlator-based physical carrier sensing can comprise a correlator-based automatic correlation process. The correlator-based physical carrier sensing can comprise a correlator-based cross-correlation process.

The signal part can comprise a preamble received according to a first sampling rate that is different relative to a second sampling rate of the wireless device; the preamble detection can determine from the signal part that the wireless channel is not clear for use as a result of an ongoing transmission based on cross-correlating the preamble with a stored preamble that accounts for distortions that result from the wireless device using the second sampling rate when the preamble is transmitted using the first sampling rate.

Figure 8:
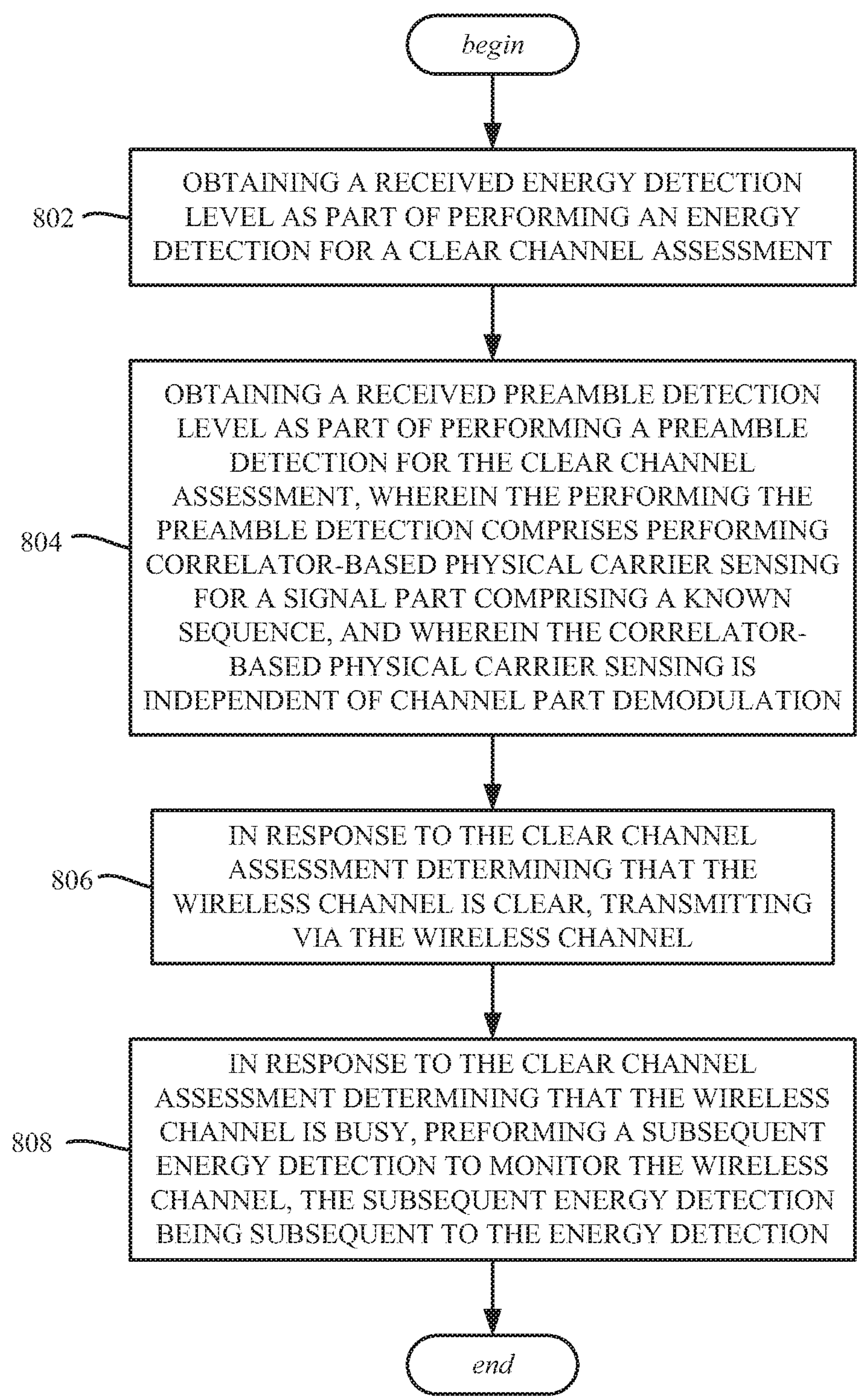
FIG. 8 illustrates example operations of a wireless communications device that uses energy detection and preamble detection with respect to a common preamble to determine whether to transmit or continue monitoring, in accordance with various aspects and embodiments of the subject disclosure.

One or more example aspects are represented in FIG. 8, and can correspond to a wireless communications device, comprising a processor, and a memory that stores executable instructions that, when executed by the processor, facilitate performance of operations. Example operation 802 represents obtaining a received energy detection level as part of performing an energy detection for a clear channel assessment. Operation 804 represents obtaining a received preamble detection level as part of performing a preamble detection for the clear channel assessment; performing the preamble detection can comprise performing correlator-based physical carrier sensing for a signal part comprising a known sequence, in which the correlator-based physical carrier sensing is independent of channel part demodulation. Operation 806 represents, in response to the clear channel assessment determining that the wireless channel is clear, transmitting via the wireless channel. Operation 808 represents, in response to the clear channel assessment determining that the wireless channel is busy, performing a subsequent energy detection to monitor the wireless channel, the subsequent energy detection being subsequent to the energy detection.

Performing the energy detection can comprise evaluating the received energy detection level using a first energy detection threshold value; the subsequent energy detection can comprise monitoring the wireless channel using a second energy detection threshold value that is different from the first energy detection threshold value.

Further operations can comprise determining the second energy detection threshold value based on the received energy detection level and the received preamble detection level. Further operations can comprise determining the second energy detection threshold value as the first energy detection threshold value minus the difference of the received energy detection level minus the received preamble detection level.

The correlator-based physical carrier sensing can comprise a correlator-based automatic correlation. The correlator-based physical carrier sensing can comprise a correlator-based cross-correlation.

The signal part comp can comprise a preamble transmitted with a first sampling rate that is different than a second sampling rate of the wireless communications device; the preamble detection can determine, from the signal part, that the wireless channel is busy with an ongoing transmission based on cross-correlating the preamble with a stored preamble that accounts for distortions that result from the wireless communications device using the second sampling rate when the preamble is transmitted using the first sampling rate.

Figure 9:
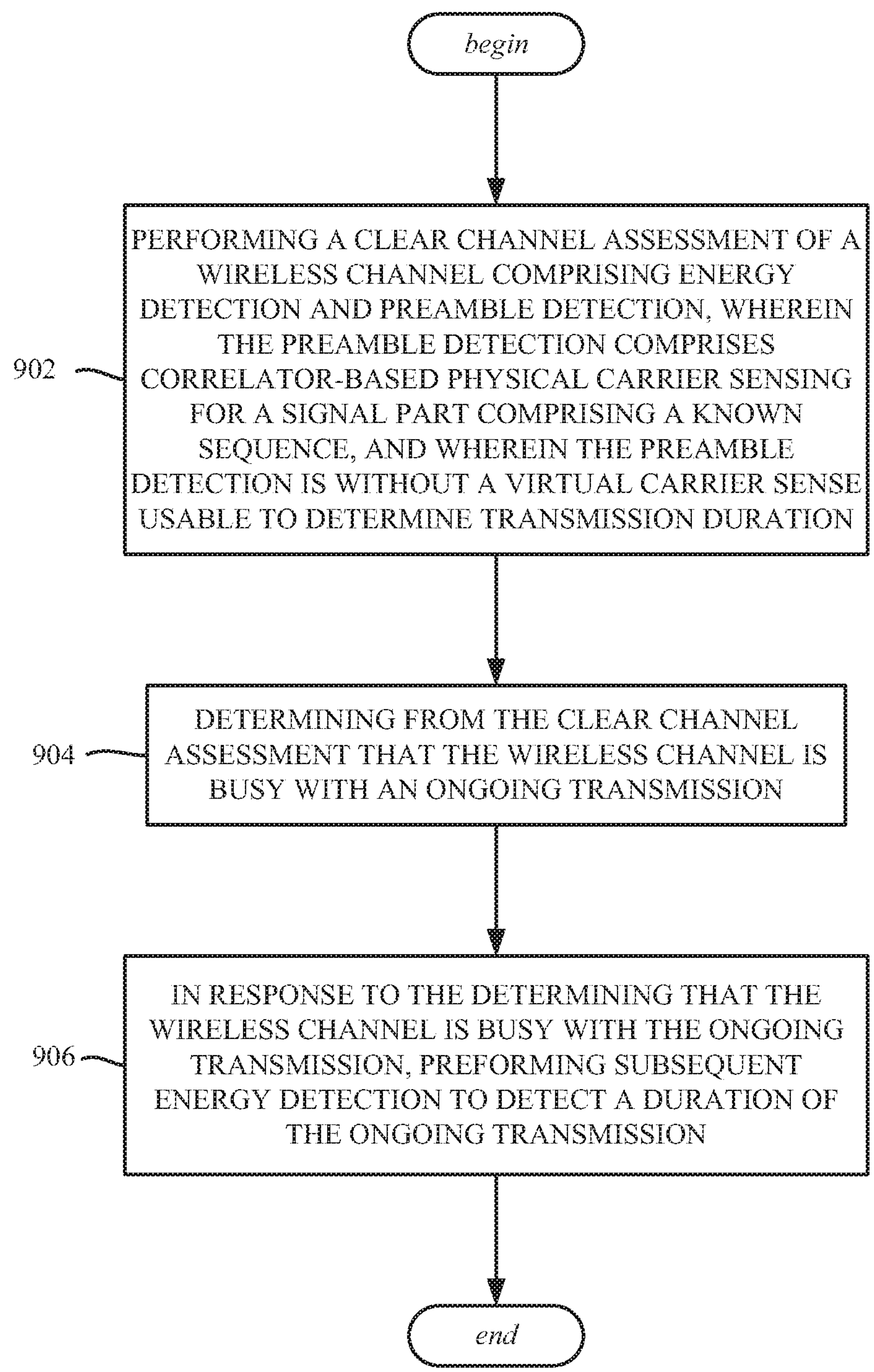
FIG. 9 illustrates example operations of a wireless communications device that performs subsequent energy detection on a channel when clear channel assessment procedure determines that a channel is busy, in accordance with various aspects and embodiments of the subject disclosure.

One or more aspects, such as implemented in a machine-readable storage medium, comprising executable instructions that, when executed by a processor, facilitate performance of example operations, are represented in FIG. 9. Operation 902 represents performing a clear channel assessment of a wireless channel comprising energy detection and preamble detection, wherein the preamble detection comprises correlator-based physical carrier sensing for a signal part comprising a known sequence, and wherein the preamble detection is without a virtual carrier sense usable to determine transmission duration. Operation 904 represents determining from the clear channel assessment that the wireless channel is busy with an ongoing transmission. Operation 906 represents, in response to the determining that the wireless channel is busy with the ongoing transmission, performing subsequent energy detection to detect a duration of the ongoing transmission.

The energy detection can evaluate a first received energy detection level with a first energy detection threshold value, and the subsequent energy detection can evaluate a second received second energy detection level with a second energy detection threshold value that is different from the first energy detection threshold value. Further operations can comprise determining the second energy detection threshold value based on a received energy detection level obtained for the energy detection and a received preamble detection level obtained for the preamble detection.

The clear channel assessment can be a first clear channel assessment, and performing the subsequent energy detection can determine that the channel is not busy; further operations can comprise, performing a second clear channel assessment of the wireless channel, determining from the second clear channel assessment that the wireless channel is not busy, and, in response to the determining that the wireless channel is not busy, transmitting a communication via the wireless channel.

The signal part can comprise a preamble transmitted with a first sampling rate that is different relative to a second sampling rate of the wireless communications device; determining from the clear channel assessment that the wireless channel is busy with the ongoing transmission can comprise cross-correlating the preamble with a stored preamble that accounts for distortions that result from the wireless communications device using the second sampling rate when the preamble is transmitted using the first sampling rate.

The correlator-based physical carrier sensing of the preamble detection can comprise a correlator-based automatic correlation scheme or a correlator-based cross-correlation scheme.

As can be seen, the technology described herein facilitates a common channel access procedure that, for example, can be used across a plurality of standards developing organizations that are developing separate radio technologies that can be deployed in the same spectrum in an uncoordinated manner. The avoidance of processing payloads and forward error correction carried by a common preamble further facilitates the usage of different sampling rates by different radio technologies that work concurrently in the same unlicensed band.

A wireless communication system can employ various cellular systems, technologies, and modulation schemes to facilitate wireless radio communications between devices (e.g., a UE and the network device). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network device) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 10:
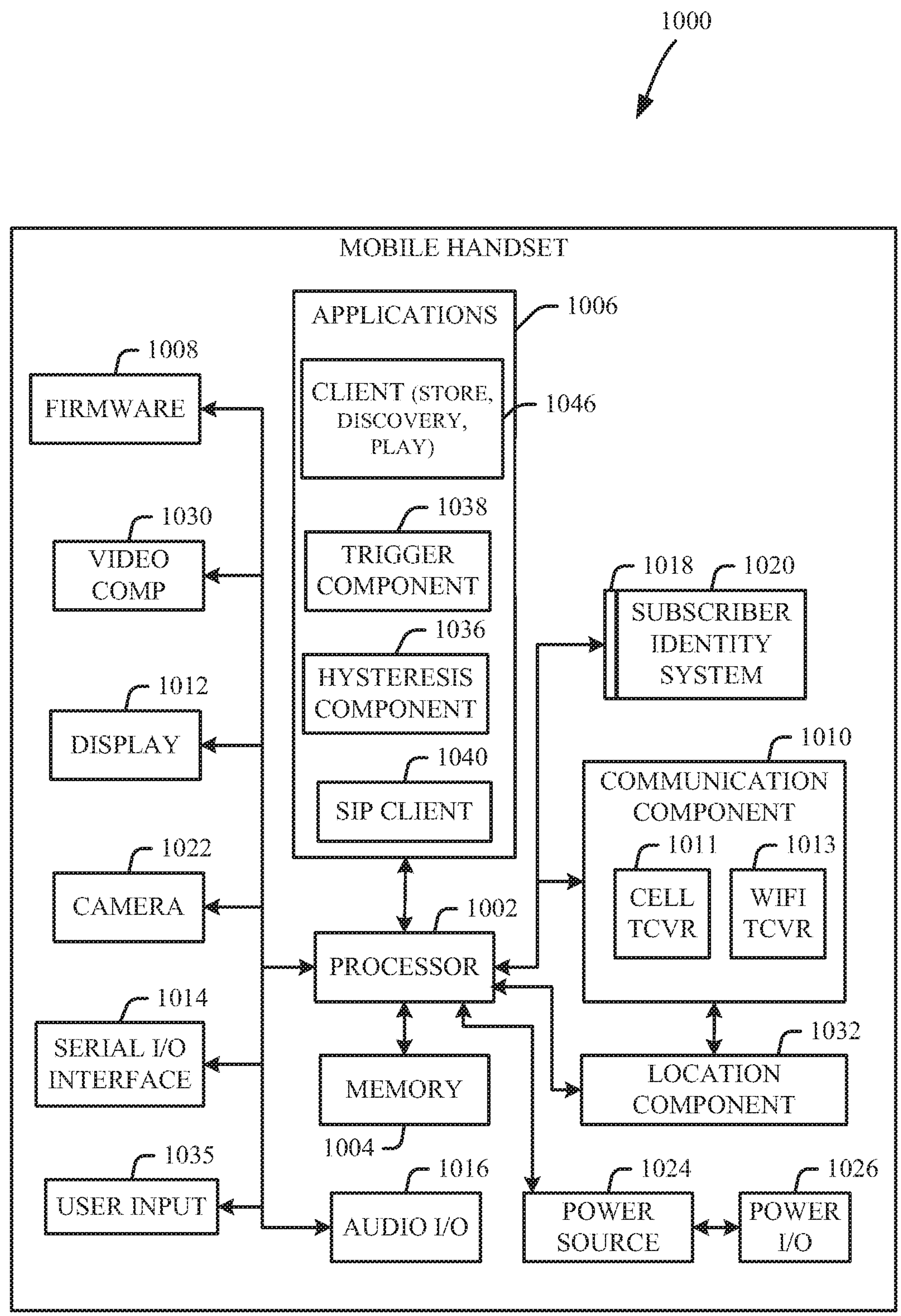
FIG. 10 illustrates an example block diagram of an example mobile handset operable to engage in a system architecture that facilitates wireless communications according to one or more embodiments described herein.

Referring now to FIG. 10, illustrated is a schematic block diagram of an example end-user device such as a user equipment) that can be a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 810, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
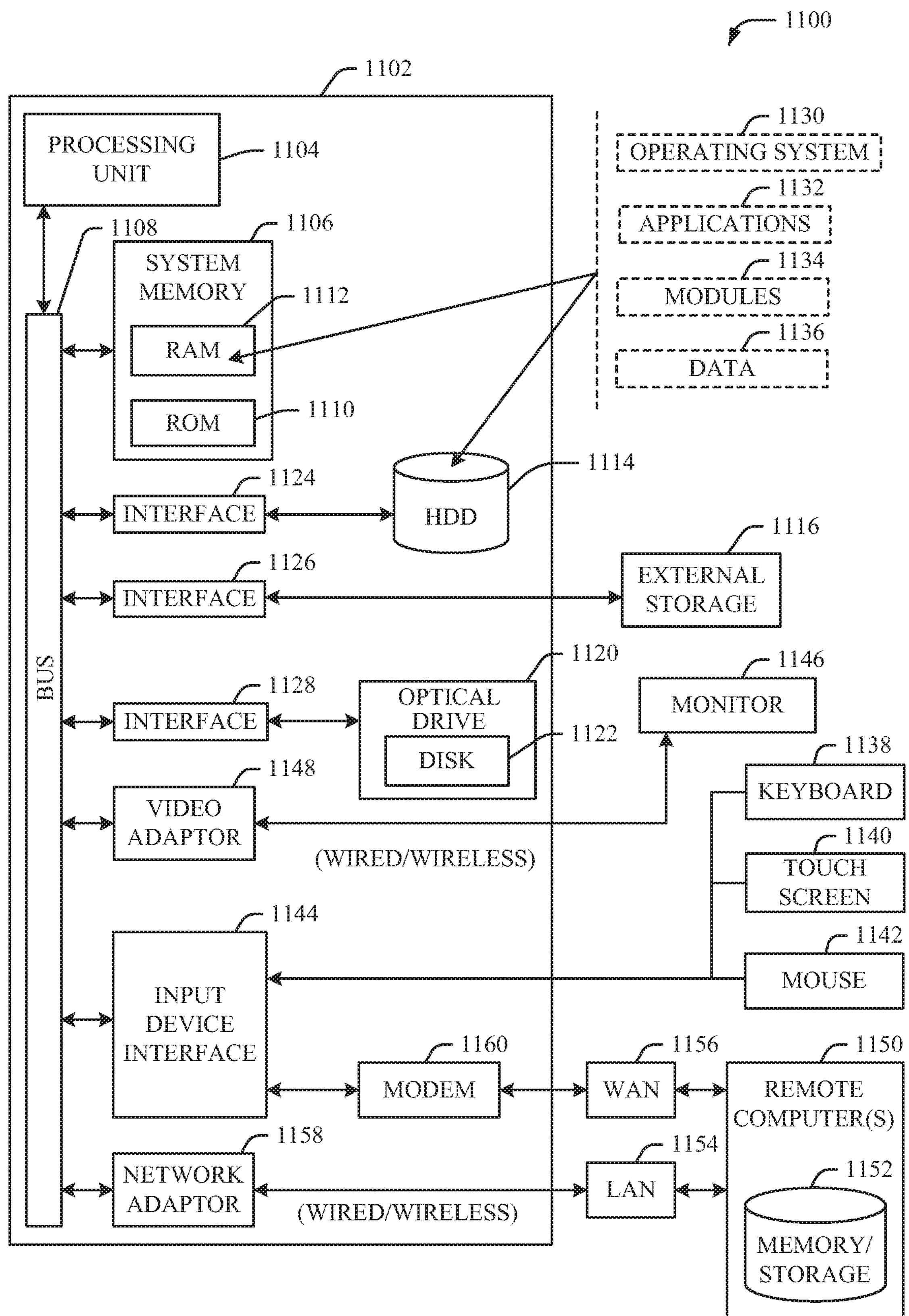
FIG. 11 illustrates an example block diagram of an example computer/machine system operable to engage in a system architecture that facilitates wireless communications according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the technology described herein can be practiced with other computer system configurations, including single-processor or multiprocessor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 11 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:

performing, by a network device comprising a processor, a clear channel assessment of a wireless channel to determine whether the wireless channel is clear for use, the clear channel assessment comprising an energy detection and a preamble detection, wherein the preamble detection comprises a correlator-based physical carrier sensing for a signal part comprising a known sequence, wherein the signal part comprises a preamble received according to a first sampling rate that is different than a second sampling rate of the network device, wherein the correlator-based physical carrier sensing does not comprise channel part decoding, and wherein the preamble detection determines, from the signal part, whether the wireless channel is not clear for use as a result of an ongoing transmission based on cross-correlating the preamble with a stored preamble, the cross-correlating accounting for a distortion that results from the network device using the second sampling rate when the preamble is transmitted using the first sampling rate; and in response to the clear channel assessment determining that the wireless channel is clear, facilitating, by the network device, transmitting information via the wireless channel.

2. The method of claim 1, further comprising, in response to the clear channel assessment determining that the wireless channel is not clear for use, performing, by the network device, a subsequent energy detection to monitor the wireless channel that is subsequent to the energy detection.

3. The method of claim 1, wherein the energy detection is a first energy detection using a first energy detection threshold value, and further comprising, in response to the clear channel assessment determining that the wireless channel is not clear for use, performing, by the network device, a second energy detection to monitor the wireless channel comprising using a second energy detection threshold value that is different from the first energy detection threshold value.

4. The method of claim 3, further comprising determining, by the network device, the second energy detection threshold value based on a received energy detection level and a received preamble detection level.

5. The method of claim 3, further comprising determining, by the network device, the second energy detection threshold value as the first energy detection threshold value minus a difference of a received energy detection level minus a received preamble detection level.

6. The method of claim 1, wherein the correlator-based physical carrier sensing comprises a correlator-based automatic correlation process.

7. The method of claim 1, wherein the correlator-based physical carrier sensing comprises a correlator-based cross-correlation process.

8. A communications device, comprising:

a processor; and a memory that stores executable instructions that, when executed by the processor, facilitate performance of operations, the operations comprising:

obtaining a received energy detection level as part of performing an energy detection for a clear channel assessment of a wireless channel;

obtaining a received preamble detection level as part of performing a preamble detection for the clear channel assessment, wherein the performing of the preamble detection comprises performing correlator-based physical carrier sensing for a signal part comprising a known sequence, wherein the signal part comprises a preamble transmitted with a first sampling rate that is different than a second sampling rate of the communications device, wherein the correlator-based physical carrier sensing is independent of channel part demodulation, and wherein the preamble detection makes a determination from the signal part whether the wireless channel is busy with an ongoing transmission based on cross-correlating the preamble with a stored preamble that accounts for a distortion that results from the communications device using the second sampling rate when the preamble is transmitted using the first sampling rate;

in response to the clear channel assessment determining that the wireless channel is clear, transmitting via the wireless channel; and in response to the clear channel assessment determining that the wireless channel is busy, performing a subsequent energy detection to monitor the wireless channel, the subsequent energy detection being subsequent to the energy detection.

9. The communications device of claim 8, wherein the performing of the energy detection comprises evaluating the received energy detection level using a first energy detection threshold value, and wherein the subsequent energy detection comprises monitoring the wireless channel using a second energy detection threshold value that is different from the first energy detection threshold value.

10. The communications device of claim 9, wherein the operations further comprise determining the second energy detection threshold value based on the received energy detection level and the received preamble detection level.

11. The communications device of claim 9, wherein the operations further comprise determining the second energy detection threshold value as the first energy detection threshold value minus a difference of the received energy detection level minus the received preamble detection level.

12. The communications device of claim 9, wherein the second energy detection threshold value is a function of energy received during the energy detection.

13. The communications device of claim 8, wherein the correlator-based physical carrier sensing comprises a correlator-based cross-correlation.

14. A non-transitory machine-readable medium, comprising executable instructions that, when executed by a processor of a user equipment, facilitate performance of operations, the operations comprising:

performing a clear channel assessment of a wireless channel comprising energy detection and preamble detection, wherein the preamble detection comprises correlator-based physical carrier sensing for a signal part comprising a known sequence, wherein the signal part comprises a preamble transmitted with a first sampling rate that is different relative to a second sampling rate of the user equipment, wherein the preamble detection is without a virtual carrier sense usable to determine transmission duration;

determining from the clear channel assessment that the wireless channel is busy with an ongoing transmission, comprising cross-correlating the preamble with a stored preamble that reduces a distortion that results from the user equipment using the second sampling rate when the preamble is transmitted using the first sampling rate; and in response to the determining that the wireless channel is busy with the ongoing transmission, performing subsequent energy detection to detect a duration of the ongoing transmission.

15. The non-transitory machine-readable medium of claim 14, wherein the energy detection evaluates a first received energy detection level with a first energy detection threshold value, and wherein the subsequent energy detection evaluates a second received second energy detection level with a second energy detection threshold value that is different from the first energy detection threshold value.

16. The non-transitory machine-readable medium of claim 15, wherein the operations further comprise determining the second energy detection threshold value based on a received energy detection level obtained for the energy detection and a received preamble detection level obtained for the preamble detection.

17. The non-transitory machine-readable medium of claim 15, wherein the operations further comprise determining the second energy detection threshold value as the first energy detection threshold value minus a difference of a received energy detection level obtained for the energy detection minus a received preamble detection level obtained for the preamble detection.

18. The non-transitory machine-readable medium of claim 14, wherein the clear channel assessment is a first clear channel assessment, wherein the performing the subsequent energy detection determines that the wireless channel is not busy, and wherein the operations further comprise, performing a second clear channel assessment of the wireless channel, determining from the second clear channel assessment that the wireless channel is not busy, and, in response to the determining that the wireless channel is not busy, transmitting a communication via the wireless channel.

19. The non-transitory machine-readable medium of claim 14, wherein the correlator-based physical carrier sensing of the preamble detection comprises a correlator-based automatic correlation scheme.

20. The non-transitory machine-readable medium of claim 14, wherein the correlator-based physical carrier sensing of the preamble detection comprises a correlator-based cross-correlation scheme.

* * * * *